United States Patent
Holladay et al.

(10) Patent No.: US 6,489,772 B1
(45) Date of Patent: Dec. 3, 2002

(54) BOREHOLE INDUCTION COIL TRANSMITTER

(75) Inventors: Gale Holladay, Livermore, CA (US); Michael J. Wilt, Walnut Creek, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 08/376,725

(22) Filed: Jan. 23, 1995

(51) Int. Cl.[7] .................................................. G01V 3/18
(52) U.S. Cl. ....................................................... 324/339
(58) Field of Search ............................... 324/323, 338, 324/339, 340, 341, 345, 346, 334, 333, 342, 343, 355, 356

(56) References Cited

U.S. PATENT DOCUMENTS

| | | | | |
|---|---|---|---|---|
| 3,094,658 A | * | 6/1963 | Bravenec et al. ............ | 324/339 |
| 3,609,522 A | * | 9/1971 | Hutchins et al. ............ | 324/334 |
| 3,690,164 A | * | 9/1972 | Gabilland et al. ........... | 324/334 |
| 4,622,518 A | * | 11/1986 | Cox et al. .................... | 324/341 |
| 4,825,166 A | * | 4/1989 | MacGugan .................. | 324/346 |
| 4,849,699 A | * | 7/1989 | Gill et al. .................... | 324/339 |
| 5,038,107 A | * | 8/1991 | Gianzero et al. ............ | 324/339 |
| 5,065,100 A | * | 11/1991 | Vail, III ...................... | 324/339 |
| 5,500,597 A | * | 3/1996 | Tickell, Jr. et al. ......... | 324/339 |

\* cited by examiner

*Primary Examiner*—Walter E. Snow
(74) *Attorney, Agent, or Firm*—L. E. Carnahan; Alan H. Thompson

(57) ABSTRACT

A borehole induction coil transmitter which is a part of a cross-borehole electromagnetic field system that is used for underground imaging applications. The transmitter consists of four major parts: 1) a wound ferrite or mu-metal core, 2) an array of tuning capacitors, 3) a current driver circuit board, and 4) a flux monitor. The core is wound with several hundred turns of wire and connected in series with the capacitor array, to produce a tuned coil. This tuned coil uses internal circuitry to generate sinusoidal signals that are transmitted through the earth to a receiver coil in another borehole. The transmitter can operate at frequencies from 1–200 kHz and supplies sufficient power to permit the field system to operate in boreholes separated by up to 400 meters.

17 Claims, 3 Drawing Sheets

BOREHOLE INDUCTION COIL TRANSMITTER

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to electromagnetic field systems, particularly to such systems utilized to provide an image of underground processes, and more particularly to a borehole transmitter utilized in a cross-borehole electromagnetic system to determine the location of such underground processes.

The central problem in petroleum production is the development of a reservoir model that guides the drilling of wells and the management of the field. Ideally, the model provides a three-dimensional numerical representation of the petroleum-bearing rock, properties of the reservoir units and the nature of the boundaries. To construct this model the reservoir engineer has only the detailed data from well logs in a limited number of holes, a geologic concept model, and more recently, structural controls provided by seismic data. The extrapolation of drill hole data to the interwall volume is an area where geophysics can be of great benefit. Using high resolution geophysics to assign physical properties to the model is a relatively new idea which could revolutionize the effectiveness of reservoir simulation.

Seismic velocity and electrical conductivity are both dependent on the porosity, saturation, temperature and anisotropy of typical reservoir rocks and consequently seismic and electrical techniques are a first choice in the search for new reservoir characterization methods. Surface-based 3-D seismic methods have already had a large impact on reservoir engineering by providing detailed maps of the geometry of producing formations and in some cases hydrocarbon distribution. This is a significant departure from their traditional role of finding target structure in an exploration program.

Electrical conductivity has an even more direct relationship to reservoir fluid properties than do seismic parameters because porosity, pore fluid conductivity, saturation, and temperature all determine the conductivity. Electrical logs are indispensable to the reservoir engineer for assessing saturation, pore fluid type and indirectly, permeability. Electrical logging measures the conductivity in the vicinity of the borehole to a radius of a few meters. Means are now at hand to map the conductivity on a reservoir scale and it is this prospect that motivates study and experiments relating to cross-bore electromagnetic methods.

Although seismic methods are relatively mature, the methodology for measuring electrical conductivity on a reservoir scale is in the development stage. Surface low frequency electromagnetic and direct current (dc) resistivity methods have been applied to process monitoring, but such has been limited to identifying the presence and general configuration of relatively shallow processes. High frequency electromagnetic (>1 MHz) methods have been used in cross-hole configuration since the early eighties, but the low resistivity of most sedimentary formations typically limits the propagation distance of these fields to a few meters.

Cross-hole and borehole-to-surface configurations typically offer improved sensitivity as compared to surface-based schemes. In surface surveys, the fields must first penetrate, with considerable loss of strength, to the target zone, produce a secondary or scattering current, and the fields from these currents again attenuate greatly in returning to the surface. This attenuation obviously limits the sensitivity of small features at depth. A further complication in surface methods is that the near-surface weathered layer is invariably inhomogeneous and thus exerts a strong attenuation and distortion of the fields from deep targets. Getting at least one of the transmitter-receiver pair near the target zone alleviates these problems somewhat but an even greater improvement occurs if both the source and receiver are placed in boreholes. For example, cross-hole dc resistivity surveys have far greater resolution than surface or surface-to-borehole configurations.

It has been established that low frequency cross-hole electromagnetic systems for reservoir scale problems have shown that a low frequency analog of seismic diffraction tomography provides good resolution of interwell features. Thus, as geophysical technology becomes mature, and the emphasis shifted to engineering and front-tracking applications, the geophysicist is directed towards the use of boreholes and electromagnetic systems. By the use of boreholes, one can escape the cultural and geological noise at the surface and also move the sensors much closer to the region of interest. Both of these are necessary to achieve the high sensitivity and high resolution imaging required.

Electromagnetic (EM) systems are typically deployed in ground-based or airborne configurations. Exception to this are the high frequency electromagnetic (HFEM) systems which are often deployed in closely-spaced boreholes. New applications of cross-borehole EM methods include petroleum reservoir characterization, front-tracking in enhanced oil recovery operations, and monitoring of subsurface fluid movements in hazardous waste applications. These applications all require the use of boreholes to achieve the necessary sensitivity. Boreholes in these applications are typically spaced up to 200 meters apart and are drilled through moderate to high conductivity rocks typically found in sedimentary basins. The large spacing of the boreholes and high conductivity makes the high frequency systems impossible to apply due to the high degree of spatial attenuation.

Cross-borehole electromagnetic systems have been developed to provide an image of underground processes; specifically to determine the location of injected plumes of steam used in the enhanced oil recovery process. The electromagnetic data can provide a determination of the subsurface electrical resistivity which is markedly changed by the introduction of steam, and thus mapping of the steam plume by the associated change in electrical resistivity can be accomplished. Such an electromagnetic system utilizes transmitters and receivers located in various boreholes in the oil field involved in enhanced oil recovery process.

While these prior efforts have greatly advanced this field of technology, to effectively apply cross-hole EM requires the development of a higher power/lower frequency system. This need is partially satisfied by the present invention directed to a borehole induction coil transmitter which can operate at frequencies from 1–200 kHz and provides sufficient signal for propagation through rocks typical of oil field strata for more than 400 meters.

SUMMARY OF THE INVENTION

It is an object of the invention to provide a borehole induction coil transmitter for through-the-earth imaging.

A further object of the invention is to provide an induction coil transmitter which can operate at frequencies from 1 Hz to 200 kHz.

A further object of the invention is to provide a borehole induction coil transmitter enclosed to survive to depths of 1 km and provides sufficient signal for propagation through oil field strata for more than 400 meters.

Another object of the invention is to provide a transmitter for a cross-borehole electromagnetic system which consists of four basic components, a wound ferrite or mu-metal core, an array of tuning capacitors, a current driver circuit board, and a flux monitor.

Other objects and advantages of the present invention will become apparent from the following description and accompanying drawings. Basically, the invention is a borehole transmitter designed to be an integral part of a cross-borehole electromagnetic system, to provide an image of underground processes, such as to determine the location of injected plumes of steam used in the enhanced oil recovery process.

The transmitter is packaged as a borehole tool and the tool encased in fiberglass, for example, and can survive to depths of 1 km. The transmitter can operate at frequencies from 1–200 kHz, which is sufficient frequency range to provide moderate to high resolution subsurface images in a typical oil field. The transmitter provides sufficient signal for propagation through rocks of a typical oil field strata for more than 400 meters, which allows the field system to be routinely used in an oil field without the need for closely-spaced drill-holes, as in the above-referenced prior high frequency electromagnetic systems. The invention is an induction coil transmitter particularly adapted for cross-hole electromagnetic systems having high power/low frequency. Two embodiments have been developed, one using a ferrite core and operating in the 250 Hz to 200 kHz range; and the other using a mu-metal core and operating in the 1 Hz to 4 kHz range. The first embodiment was designed for relatively shallow environmental applications, and the other embodiment being for deeper, higher temperature boreholes and in steel-cased boreholes, and described in greater detail hereinafter.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The present invention is a borehole induction coil transmitter for applications such as cross-borehole electromagnetic (EM) systems utilized in mapping oil fields. The transmitter consists of four (4) major sections, a wound core, an array of tuning capacitors, a current driver circuit board, and a flux monitor. The core may consist of iron (ferrite) or mu-metal, and the wire wrapping for each may, for example, be 100 and 350 turns, respectively. The coils are tuned to resonance with capacitors to counteract the induction reactance of the coils. The transmitters can operate either from an amplified signal supplied by the logging cable or they can be made to self-resonate using dc power supplied from the surface.

In verification of the invention, two transmitters using different cores have been fabricated and tested. The first is a lightweight, low-power antenna with a ferrite core, and for use in relatively shallow environmental applications and has a usable frequency range from 250 Hz to 200 kHz. The second transmitter is a higher power, more environmentally hardened version with a mu-metal (defined as green oriented steel) core and a frequency range from 1 Hz to 4 kHz, and designed for deeper, higher temperature boreholes utilized in enhanced oil recovery operations.

The large mu-metal transmitter was tested, as described thereinafter, using two plastic-lined boreholes spaced 100 meters apart. The field system was operated at frequencies of 512 and 2048 Hz and the field profiles demonstrated a high sensitivity to the subsurface resistivity distribution. Data profiles could be fit to better than one percent to layered models that closely approximate the flat lying structure of the oil field. It was also found that field profiles could be reproduced to better than one percent over a twenty-four hour period.

Considerations in the design of a borehole transmitter include allowable dimensions (i.e. to deploy in boreholes), operating frequency, transmitter power, weight, and durability. The specific application will have a bearing on the tool design. By use of existing numerical modeling codes criteria for the optimum transmitter power (dipole moment) and the operating frequencies can be obtained.

Figure 1:
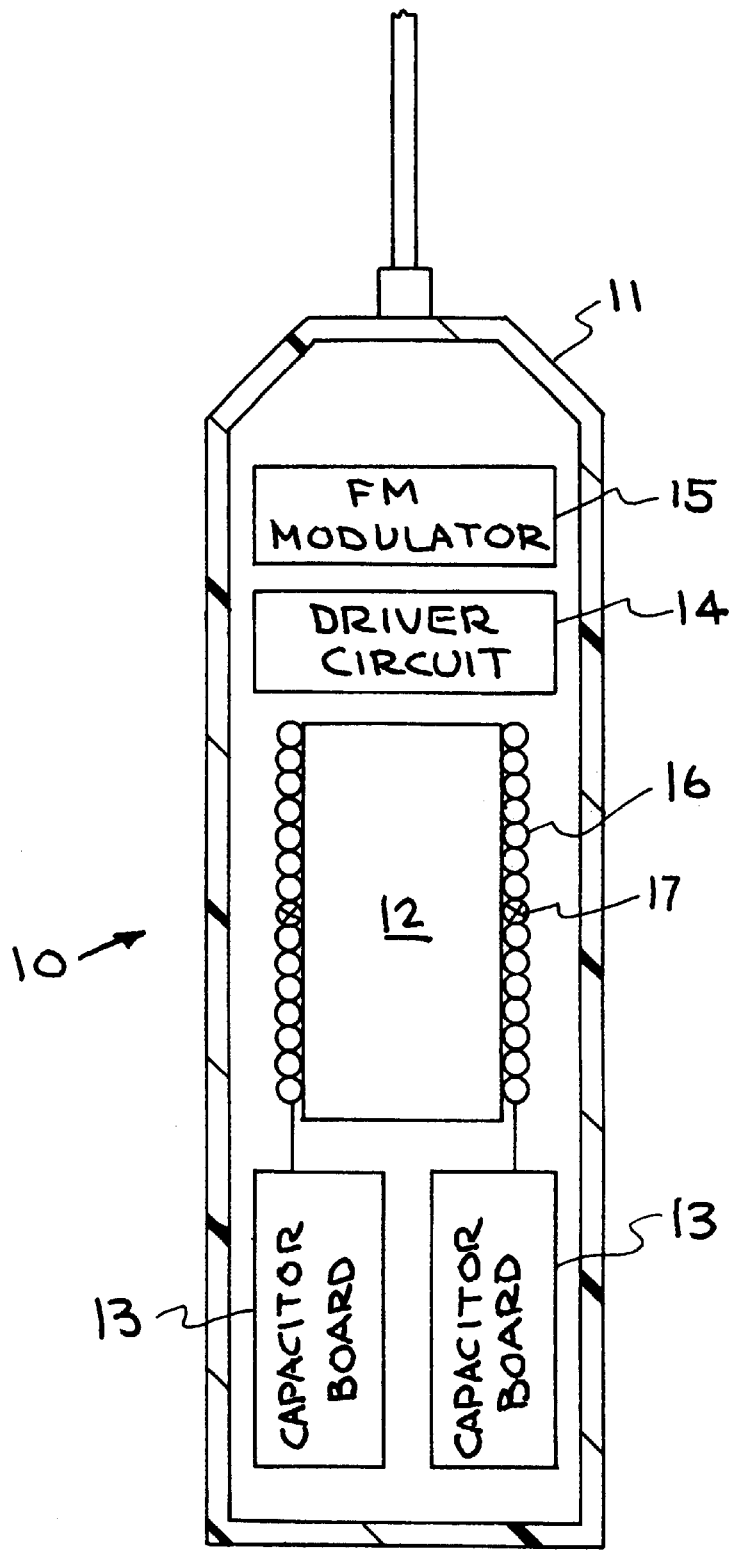
FIG. 1 is a partially cut-away view of an embodiment of the borehole coil transmitter made in accordance with the present invention.
Figure 2:
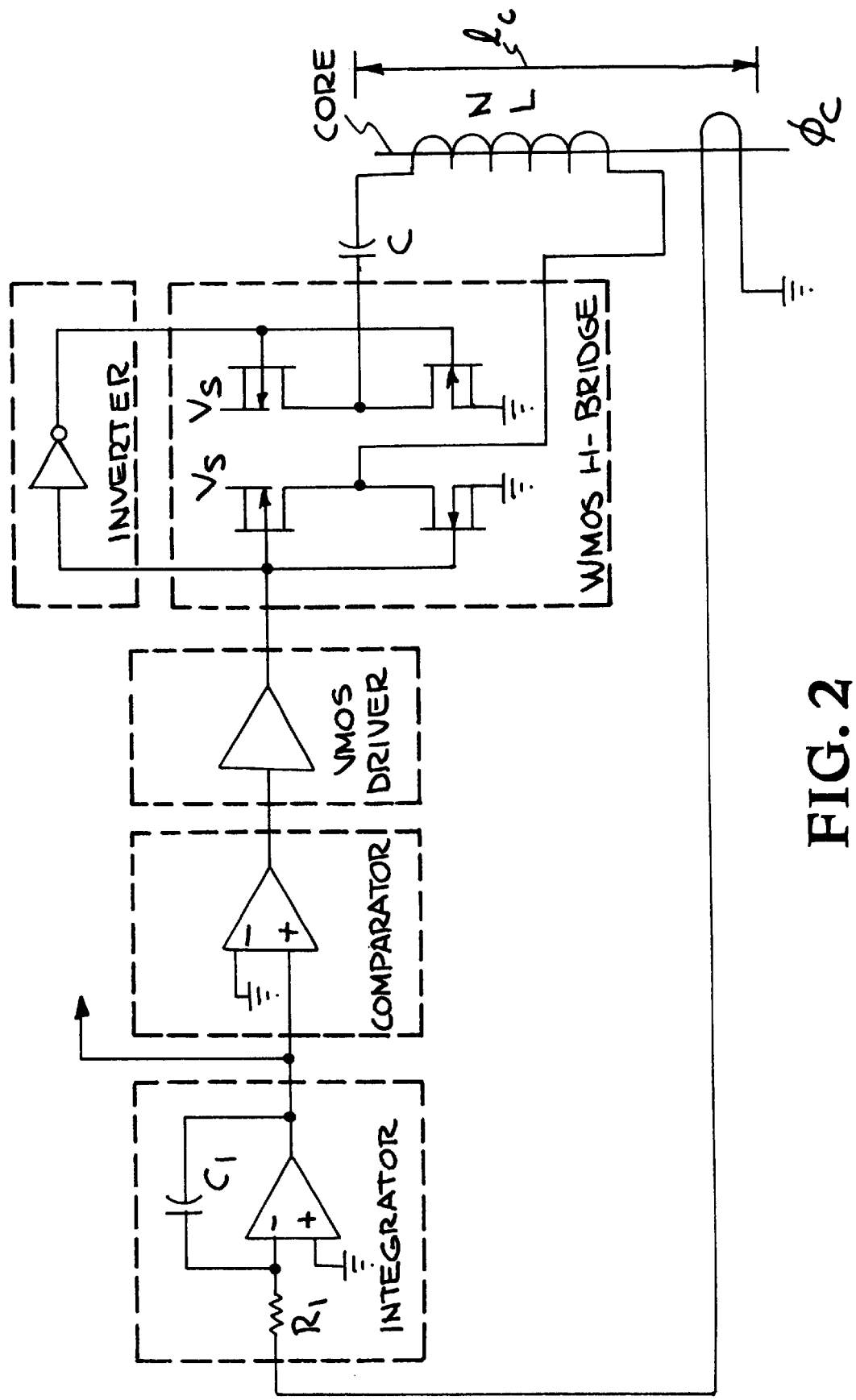
FIG. 2 is a schematic illustration of an oscillator-driven, self excited transmission mode for use with the transmitter of FIG. 1.
Figure 3:
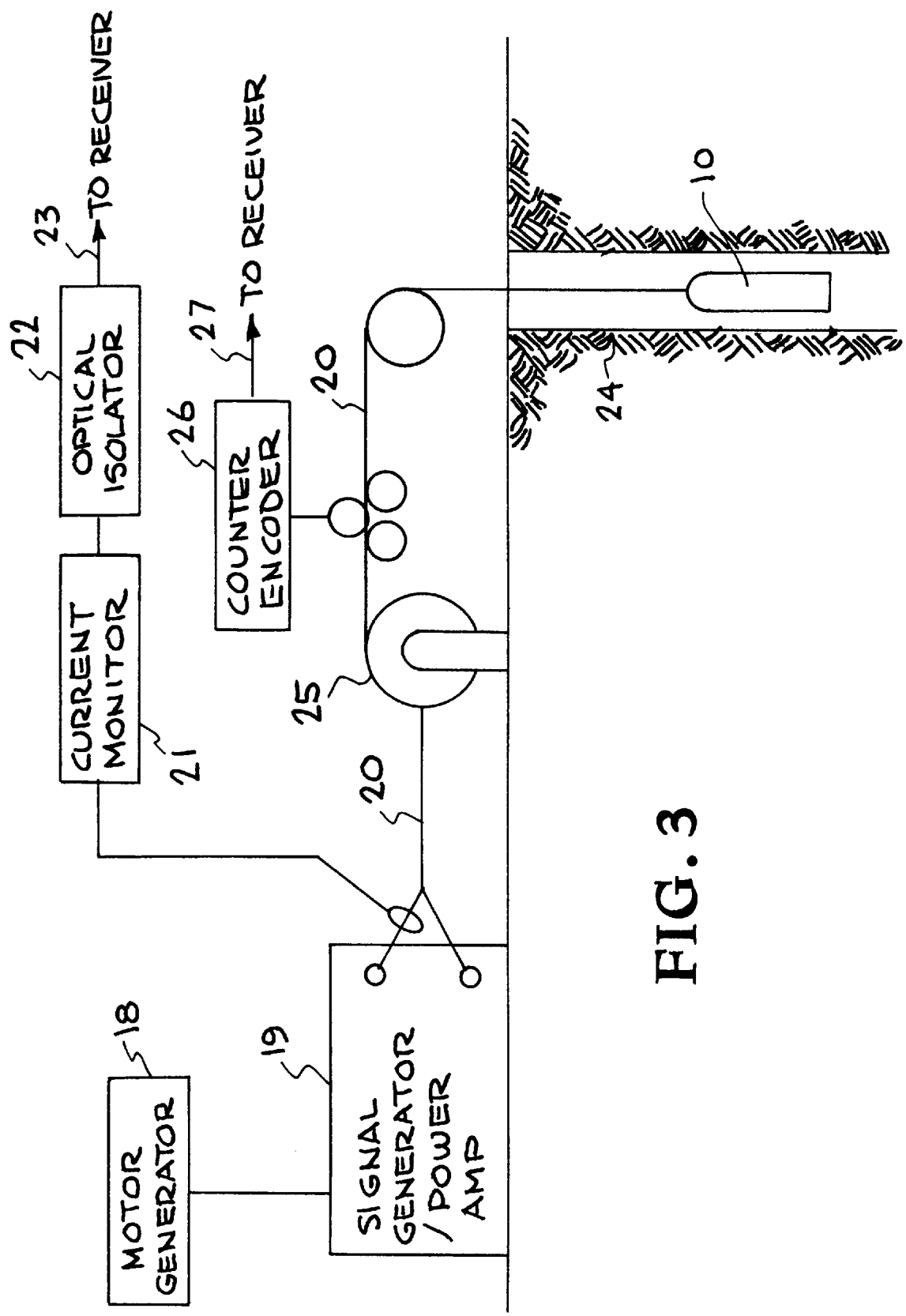
FIG. 3 is a schematic illustration of a cross-borehole electromagnetic passive mode transmission system incorporating the transmitter of FIG. 1.

Referring now to the drawings, FIG. 1 illustrates an embodiment of a borehole transmitter using a ferrite core, which can be operated as either a passive antenna with amplified signal supplied from the surface, as illustrated in FIG. 3, or as a self-excited oscillator with dc power supplied from the surface, as illustrated in FIG. 2, each being described in greater detail below. The transmitter of FIG. 1 is packaged as a borehole tool, indicated at 10, which, for example, is 12 cm in diameter, 2 meters long, and weighing about 35 kg. The tool is encased in a fiberglass casing 11 and can survive to depth of 1 km. The transmitter system or tool consists of four basic parts or sections, a wound ferrite core 12, an array of tuning capacitor boards 13, a current driver circuit board 14, and a FM modulator 15. The ferrite core constitutes the center of the transmitter system; it is wrapped with 100–500 turns of copper wire 16 and is connected in series with the tuning capacitors 13. The wire wrapping may also be composed of aluminum or other electrically conductive wire. The capacitors 13 are used to tune the coil 12 to a resonant frequency. At the resonant frequency (which is determined by the inductance of the coil 12 and the capacitance of the array of capacitors 13) the coil 12 operates most efficiently. The current driver 14 automatically drives the transmitter at this resonant frequency, thereby eliminating the need for an external waveform generator. The output of the coil 12 is monitored with a separate turn of wire or flux winding 17 around the central section of coil 12, which measures the time derivative of the magnetic flux emitted by the transmitter. The wire of winding 17 may be copper, aluminum, or other electrically conductive wire. This flux signal is then used to determine the strength and relative phase shift of the transmitted signal, which information is used at the receiver station in the measurement and calibration of the magnetic field.

The transmitter can operate a frequencies from 1 Hz to 200 kHz. This is sufficient frequency range to provide moderate to high resolution subsurface images in a typical oil field. The transmitter provides sufficient signal for propagation through rocks typical of oil field strata for more than 400 m. This allows the field system to be routinely used in an oil field without the need for a lot of closely-spaced drill holes.

As pointed out above, a ferrite core transmitter has been fabricated and tested for use as a lightweight, low-power antenna in relatively shallow environmental applications and has a usable frequency range from 250 Hz to 200 kHz. In this fabricated embodiment of the ferrite core transmitter as a low-power antenna, it utilized a ferrite rod 1.97 m long, 4.4 cm in diameter, with a 1.9 cm diameter hole along the center. The copper wire turns, 25–300 in this test embodiment, were spaced uniformly along the length of the ferrite core. The number of turns is selected to maximize the magnetic dipole moment, considering the frequency, driving circuit capability, power supply, configuration, supply cable resistance, etc. Since the number of turns is not easily changed, an optimum value is selected for a central frequency; adjacent frequency values are achieved at somewhat less than optimum by changing tuning capacitors and power supply parameters. Typical configurations and the resulting magnetic dipole moments, M, are set forth in Table I, where F is the frequency, N is the number of turns of wire on the core, L is the antenna inductance, C is the tuning capacitance, $V_s$ is the excitation voltage, and $I_s$ is the excitation current:

TABLE I

| F (Hz) | N (Turns) | L (mH) | C (uF) | $V_s$ | $I_s$ | M |
|---|---|---|---|---|---|---|
| 278 | 375 | 12.4 | 26.4 | 14.6 | 5.0 | 271 |
| 557 | 375 | 12.4 | 6.6 | 16.1 | 5.0 | 270 |
| 1204 | 375 | 12.4 | 1.42 | 20.0 | 5.0 | 271 |
| 2300 | 375 | 12.4 | 0.387 | 35.3 | 4.3 | 246 |
| 4650 | 125 | 1.95 | 0.6 | 16.0 | 5.0 | 127 |
| 9300 | 125 | 1.95 | 0.15 | 25.8 | 5.0 | 131 |
| 18200 | 125 | 1.95 | 0.0392 | 35.1 | 3.5 | 93 |
| 73600 | 109 | 1.25 | 0.0037 | 61.7 | 2.0 | 44 |
| 99460 | 109 | 1.25 | 0.002 | 100.0 | 1.98 | 43 |
| 137350 | 109 | 1.25 | 0.0011 | 100.0 | 1.22 | 26.5 |

The dipole moment (M) here is limited by the power supply or signal generator capability, $V_s$ and $I_s$. At frequencies up to 20,000 Hz our power supply could provide a maximum of 5 amps at 35 volts; for frequencies above 20,000 Hz our power supply could provide a maximum of 2 amps at 100 volts. Of course the transmitter moment could be easily increased from these values simply by using a more powerful power supply; many are commercially available. The absolute maximum moment of this antenna, as limited by core saturation, is approximately 750; this is readily reached at the lower frequencies. As the frequency increases, core losses increase somewhat faster than frequency, and the moment is limited by allowable heat dissipation.

The antenna housing of the tested prototype, about 2.6 m long, was made up of 5 cm fiberglass pipe and fittings, giving it an outside diameter of about 8 cm. A bottom plug unscrews to provide access to the tuning capacitors, for changing the operating frequency. The antenna top will interchangeably accept various 8 cm caps, in which are installed connectors as required to mate with the local sounding cable.

The selection of ferrite as the rod material is a compromise. At frequencies of 1 kHz or less, a rod made up of layers of grain oriented steel (mu-metal) will give larger values of M due to a saturation flux density several times higher than ferrite. As the frequency is increased, however, eddy current losses within the steel increase rapidly, so that, given limited driving power and/or heat dissipation capability, the advantage swings to high permeability Mn—Zn ferrite. Above 1 MHz, powdered iron, low permeability Ni—Zn ferrite, or air become competitive. The antenna core was made of Magnetics "F" type ferrite, which has initial permeability, $U_i$, of 3000, and a flux saturation level, $B_s$, of 0.47 T. By varying the number of excitation winding turns N, and using appropriate tuning capacitors, the antenna rod produces satisfactory results over the range of frequencies 200 Hz to 200 kHz.

The ferrite core for the prototype model was constructed of stacked toroids and is considerably less effective than an antenna of solid ferrite. The stacked toroids have the advantage of a lower cost and they are available off-the-shelf. The calculated magnetic moment M for a single piece antenna of the same dimensions as the actual antenna would be $$M = NAIU_e = NAIU_{rod} F_a A_r$$

where:

N=uniform excitation winding turns

A=area of the antenna cross-section

I=signal current $U_e$=moment enhancement due to the rod $U_{rod}=B_c/B_a$, ratio of flux at center of the antenna with and without the core $F_a=B_{av}/B_c$, ratio of average flux over the rod to the flux at the center $A_r=A_f/A_c$, fraction of core area actually covered by ferrite $U_{rod}=560$ $F_a=0.765$ For N=125, A=0.00152, I=5, $A_r$=0.82, $M_c$=334, calculated moment From the TABLE I, the measured moment at F=9300 Hz, $M_m$, is 131 a-m². This difference is mostly due to air gaps between the toroids caused by imperfectly flat surfaces and beveled corners. It should be noted that the ultimate M obtainable from a rod, as it is driven to saturation, is chiefly determined by the flux saturation, $B_s$, and the volume of the rod material. Note also that the moment can be increased several percent by concentrating excitation turns towards the rod ends. This will produce more uniform flux levels throughout the rod material.

The ferrite core transmitter of FIG. 1 can be operated as either a self-excited oscillator, with direct current (dc) power supplied from the surface, as illustrated in FIG. 2, or as a passive antenna with amplified signal supplied from the surface, as illustrated in FIG. 3.

In the self-excited mode, illustrated in FIG. 2 with the major components indicated by legends, the transmitter consists of a ferrite loop antenna, resonating capacitors, a feedback oscillator-driver, and an FM flux monitor link from transmitter to surface via the supply cable. The driver for the resonant elements is made up of enhancement-mode field-effect transistor switches arranged a push-pull H-bridge. This gives very good efficiency and low heat dissipation. A disadvantage of the switching driver is that at the low and high frequency extremes, and whenever the core is driven close to saturation, the resonant Q becomes low. This results in a loss of frequency stability and spectral purity. Note that the Q for these circuits typically ranges from 4 to 6. The capacitors (c) series-tune the antenna to the desired operating frequency. The feedback oscillator automatically excites the antenna at the resonant frequency. Note that this frequency may drift as the antenna inductance is affected by changing temperatures or ground loading. The FM link converts the analog of the antenna core flux, derived from a separate winding on the core, to an FM-modulated carrier, transmits the carrier up the supply cable, and demodulates back to the flux analog at the surface. This provides an estimate of the magnitude and phase of the magnetic dipole for use in data processing. As presently configured, the coil will operate at frequencies from 200 Hz to 20 kHz. Since the details of FIG. 2 do not constitute part of the present invention, further description is deemed unnecessary.

The self-excited transmitter (FIG. 2) is converted to the passive mode (FIG. 3) by installing jumpers to bypass the driver and monitor circuits. As shown in FIG. 3 a simple signal generator 18 and power amplifier 19 are used to generate the sinusoidal signal and amplify it to several hundred watts. This boosted signal is sent down a balanced wireline cable 20 and transmitted by the borehole tool 10. The current level, which is roughly proportional to the transmitter dipole moment (M), is monitored with an inductive type detector or monitor 21, and this signal is optically isolated by isolator 22 and sent by shielded cable 23 to the receiver.

In practice the current and transmitter moment are only roughly proportional due to the nonlinear nature of the ferrite (or mu-metal) used as core material. To correctly determine the transmitter moment from a measurement of the current it is therefore necessary to determine the relation between the magnetic flux and current in the windings, which will be different for each core. This may be done simply by measuring the voltage in an external winding on the coil, at a number of different current levels, and plotting this quantity against the current. The plot shows that the flux can be well described by a second order polynomial function of the current.

With either antenna the tool 10 is moved within a borehole 24 by a motorized winch 25 and the depth level of the source is determined using a wheel-type encoder 26 that fits over the wireline cable 20. This depth information is sent to the receiver station using an isolated line 27.

The downhole elements of the prototype mu-metal transmitter are the antenna and tuning capacitors. The antenna was a laminated mu-metal core 7.5 cm in diameter, 2.4 m, long wound with 350 turns. To improve the uniformity of signal flux along the core, the turns were more closely spaced near the ends. The signal drive is supplied by a surface supply. Signal current, $I_s$, is limited to 10 amperes by considerations of heat dissipation in the cable when stowed on its reel, and core heat dissipation, Pco, is limited to 1000 watts.

Again, the number of turns is not easily changed, so the 350 turns was selected for optimum operation at a central frequency. The inductance of the core, approximately 42 mH, is canceled, where necessary, by inserting series resonating tuning capacitors. The resulting configurations are summarized below in TABLE II ($V_s$ is the voltage across the transmitter and does not include the cable).:

TABLE II

| F (Hz) | C (uF) | $V_s$ (V) | $I_{s\,(a)}$ | Pco (watts) | M |
| --- | --- | --- | --- | --- | --- |
| 61 | Untuned | 163 | 10 | 8 | 2351 |
| 123 | Untuned | 326 | 10 | 31 | 2351 |
| 246 | 10.0 | 41 | 10 | 117 | 2351 |
| 492 | 2.5 | 74 | 10 | 440 | 2351 |
| 983 | 0.625 | 151 | 7.8 | 998 | 1833 |

TABLE II-continued

| F (Hz) | C (uF) | $V_s$ (V) | $I_{s\,(a)}$ | Pco (watts) | M |
| --- | --- | --- | --- | --- | --- |
| 2000 | 0.152 | 261 | 4 | 992 | 940 |
| 4093 | 0.036 | 483 | 2 | 950 | 470 |

The mu-metal transmitter was tested at a Devine, Texas test site, established and operated by British Petroleum is located some 30 miles southwest of San Antonio, Tex. The site was established to test geophysical methods and instrumentation. It is located in an isolated area, away from sources of cultural noise, but still within reasonable access to population centers. Three boreholes are available for experimental use; two boreholes are steel-cased to 160 m and plastic lined below this to a depth of 900 m; a third borehole is steel-cased to a total depth of 900 m. The two plastic-lined holes are separated by 100 m. The geology at the site consists of a sequence of sandstones, shales and limestones. Individual beds are continuous and flatlying across the entire site as is evident from an examination of the well logs. The borehole resistivity logs show variations from 1 to 300 ohm-meters with the higher resistivity layers (limestones) concentrated towards the base of the section and the sandstone and shale layers ranging in resistivity from 1 to 10 ohm-m.

For the Devine test, it was decided to collect a set of cross-hole profiles spanning a change in resistivity from 2 to 3 ohm-meter sands and shales to a 30 meter thick, 10 ohm-m, predominantly limestone layer and back to sands and shales. For each profile the source moves between fixed depths 120 m apart and the receiver remains fixed in the other borehole at a depth within these limits. Subsequent profiles are then made between the same source positions using different receiver locations. Each set of profiles corresponds to 13 receiver position covering a similar depth span as the source coil.

A particular borehole segment is logged by moving the transmitter coil upwards at a fixed rate while the receiver remains stationary in another borehole. Although equivalent information could be collected by moving the receiver coil rather than the transmitter, doing so results in very noisy data due to the motion of the sensitive detector in the earth's magnetic field. The source coil is typically moved at a rate of 3–5 m/minute. This allows sufficient time for signal averaging, but is still a reasonable rate for data collection.

Data is typically collected at approximately one meter intervals within a logging span. At each measurement point five readings are averaged as the transmitter moves past. For cross-borehole logging we typically log over a 100–150 meter interval. Logging intervals greater than this needlessly reduce the signal to noise ratio and lessen the sensitivity to the formation conductivity.

Sample cross-borehole magnetic field plots were made. These results were taken from the Devine test site experiment. The plots showed the amplitude and phase of the vertical magnetic field at a frequency of 512 Hz as the transmitter moves between 550 m and 670 m in one borehole while the receiver is fixed at 598 m in a second borehole 100 m away. The amplitude plot shows a smoothly varying magnetic field, given in picoteslas (pT) per unit magnetic moment, that forms a peak where the source and receiver coils are in closest proximity and an approximately symmetrical decrease in field strength away from the peak. The transmitter moment is approximately 1000 so the detected fields are at the level of tens of pT. (Note that the system noise level is approximately 0.010 pT). The phase data are also smooth but they display more character than the amplitude results. Near a depth of 600 m the phase forms a peak and it "rolls off" sharply above this. This sharp phase rotation correlates to a decrease in subsurface resistivity as the transmitter passes from resistive limestone below 600 m to less resistive sands and shales above this depth.

The above profile was measured twice on successive days to establish the precision level of the system; the difference between the data sets was displayed. This showed that the amplitude difference over the 24 hour period was less than 1.0 percent for all points, with an average of 0.3 percent. The difference in phase averaged less than 0.2 degree. Both of these are well within the guidelines of 1.0 percent for amplitude variations and 0.5 degrees for phase established for imaging requirements.

In many ways the borehole environment is benign for EM measurements. At depths more than a few hundred meters the influence of cultural electromagnetic noise and vibration is greatly diminished. In addition, the often variable and troublesome surface layer does not affect interpretation since measurements are made at depths considerably beneath it.

It has thus been shown that the present invention provides a borehole transmitter for cross-hole EM systems that is of a higher power/lower frequency, and thus enables the achievement of high sensitivity and high resolution imaging of underground processes. The transmitter can operate at frequencies from 1 Hz to 200 kHz and supplies sufficient power to permit the field system to operate in boreholes separated by 400 m. In addition, the borehole induction coil transmitter of this invention can be designed for relatively shallow environmental applications, or for deeper (1 km depths), higher temperature boreholes and in steel-cased boreholes, by changing the composition of the core and the number of wire wraps forming the coil.

While particular embodiments have been described and/or illustrated, particular materials, parameters, powers, frequencies, etc., have been set forth to provide an understanding of the invention and examples utilized in fabricating the invention, such are not intended to the limiting. Modifications and changes may become apparent to those skilled in the art, and it is intended that the invention be limited only by the scope of the appended claims.

What is claimed is:

1. A borehole induction coil transmitter comprising:
   an enclosed casing adapted to be positioned in a borehole;
   a core positioned in and enclosed by said casing and composed of material selected from the group consisting of ferrite and mu-metal;
   said core having a coil of electrically conductive material wrapped there around;
   said coil being composed of a wrapping of a wire composed of said electrically conductive material, such that the wire wrapping is selected from the group of even spaced wraps along a length thereof, and even spaced wraps along a portion of the length with more closely spaced wraps near the ends thereof;
   an array of capacitors positioned in and enclosed by said casing and connected in series with said coil of electrically conductive material to tune the coil to a resonant frequency;
   a flux monitor positioned in and enclosed by said casing including a wire winding around a central section of said coil;
   a current driver positioned in and enclosed by said casing for driving the transmitter at the resonant frequency; and
   means connected to said enclosed casing and adapted to retain said enclosed casing in an associated borehole.

2. The transmitter of claim 1, wherein said casing is constructed of fiberglass.

3. The transmitter of claim 1, wherein said electrically conductive material is selected from the group of copper and aluminum.

4. The transmitter of claim 1, wherein said core is composed of ferrite, and said coil is composed of copper wire.

5. The transmitter of claim 1, wherein the wire wrapping contains about 100–500 turns.

6. The transmitter of claim 1, wherein said core is composed of mu-metal.

7. A transmitter for use in a cross-hole electromagnetic imaging system comprising:
   an enclosed casing adapted to be positioned in a borehole;
   a core located in said enclosed casing;
   a coil of electrically conductive wire wrapped around the core;
   a plurality of capacitors located in said enclosed casing and connected in series with said coil of wire;
   means located in said enclosed casing for driving the transmitter; and
   means located in said enclosed casing for monitoring the time derivative of flux of the transmitter;
   said flux monitoring means including a separate turn of wire around said coil for measuring the magnetic flux emitted by the transmitter.

8. The transmitter of claim 7, wherein said core is composed of material selected from the group consisting of ferrite and mu-metal.

9. The transmitter of claim 7, wherein said electrically conductive wire is selected from the group consisting of copper and aluminum.

10. The transmitter of claim 7, wherein said flux monitoring wire wrapped around said coil is constructed of material selected from copper and aluminum.

11. The transmitter of claim 7, wherein said driving means comprises a current driver circuit operatively connected to said coil.

12. The transmitter of claim 7, wherein said plurality of capacitors are tuning capacitors to tune the coil to a resonant frequency, and wherein said driving means drives the transmitter at that resonant frequency.

13. The transmitter of claim 7, wherein said core is composed of ferrite, and said coil is composed of copper wire.

14. The transmitter of claim 7, wherein said core is composed of mu-metal, and said coil is composed of copper wire.

15. The transmitter of claim 7, wherein said coil is composed of about 25 to about 500 wraps of wire.

16. The transmitter of claim 1, wherein said core is ferrite and said transmitter is operated as a self-excited oscillator, with direct current power supplied thereto.

17. The transmitter of claim 7, wherein said core is ferrite and said transmitter is operated as a passive antenna, with an amplified signal supplied thereto.

* * * * *